Figure 1:
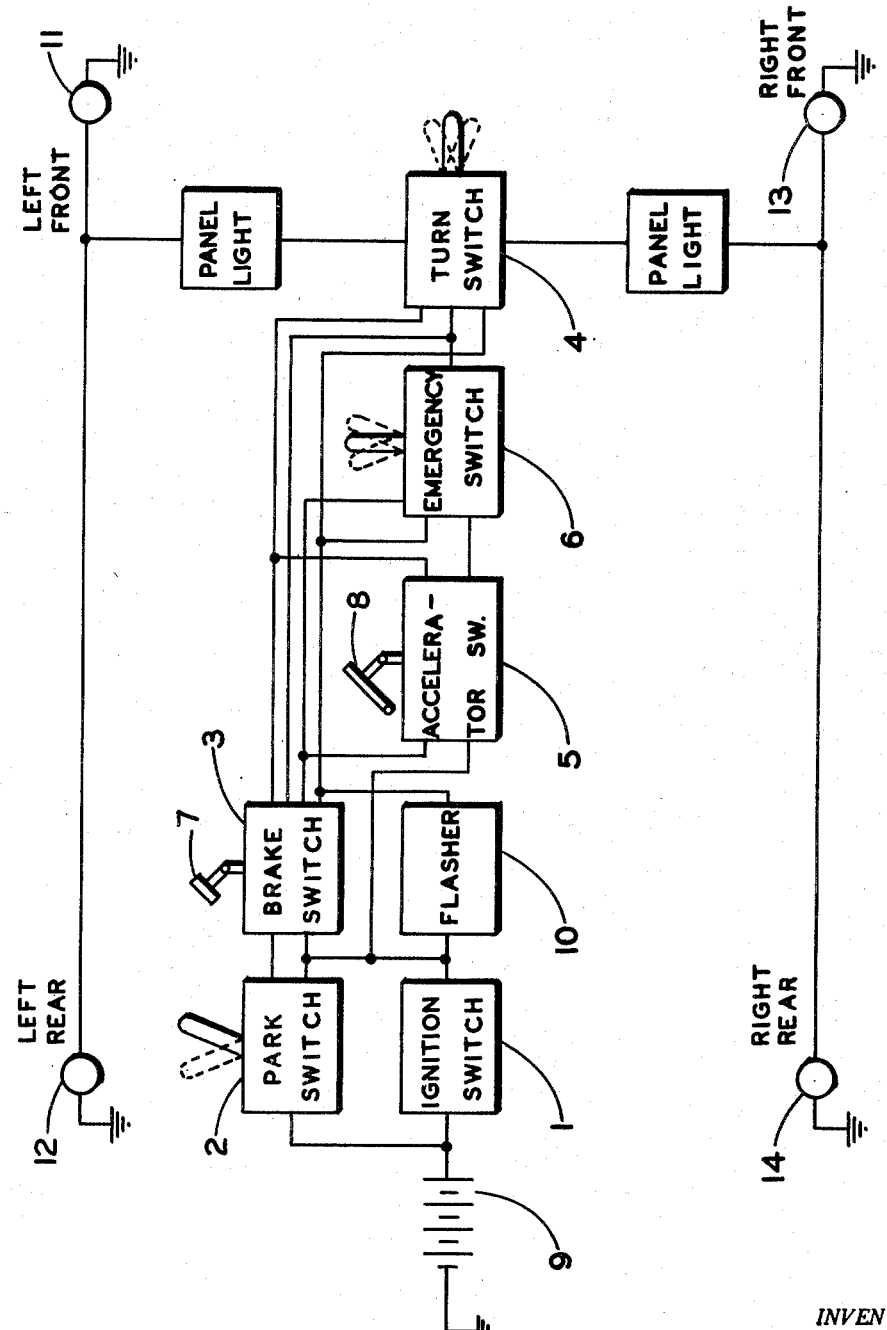

INVENTOR.
CHARLES R. DAWS

INVENTOR.
CHARLES R. DAWS
ATTORNEY

United States Patent Office 2,835,880
Patented May 20, 1958

2,835,880

DIRECTION SIGNAL CIRCUIT FOR MOTOR VEHICLES

Charles R. Daws, Lancaster, Calif.

Application September 14, 1956, Serial No. 610,018

8 Claims. (Cl. 340—81)

This invention relates to direction signal circuits and particularly to direction signal circuits for motor vehicles.

In the past, motor vehicles, such as automobiles and trucks, have been equipped with direction signal circuits. Past circuits have indicated a contemplated turning of the motor vehicle by utilizing flashing lights in the front and rear of the vehicle and on the side toward which the operator was contemplating turning. These circuits have also indicated a braking condition of the vehicle by one or more bright lights of constant intensity in the rear of the vehicle. A parking or "twilight" traveling condition was indicated by low intensity lights of constant magnitude in the front and rear of the motor vehicle.

It is to be noted that the basis for all direction signal lights of like nature placed on motor vehicles is to communicate information to the operators of other motor vehicles and to pedestrians relative to the present actions and contemplated future actions of the operator of the instant vehicle. It is to be desired that an optimum amount of information be conveyed in the shortest possible time to such persons.

The past direction signal circuits, described above, are subject to serious deficiencies insofar as the safe operation of motor vehicles is concerned. It has been found that the braking condition indication of these circuits is confusingly similar to the parking or twilight condition indication. The bright braking lights, also generally termed stop-lights, are energized at the will of the driver, or simply by depressing the brake foot pedal. However, since drivers to the rear cannot always definitely ascertain whether the one or two lights in front of them are merely tail lights or are stop lights, unless he happens to be looking in that direction at the instant they are energized by the application of the brakes, a different and more readily apparent indication should be provided. Further, there is no forward indication of the braking condition. It is frequently desirable for a pedestrian entering a crosswalk or a motorist entering a highway from a side street to know whether an oncoming car is applying his brakes or not.

The past direction signal circuits have also provided no indication of the condition of operation of the motor vehicle known as "coasting" or decelerating without the application of brakes. There is a finite time interval between the removal of the foot of the operator of a motor vehicle from the accelerator and the depression of the brake pedal. By providing an indication of the instant the operator releases the accelerator, advance warning is provided to the operator of the rear vehicle that the car in front of him is slowing down and might be about to apply the brakes. Further, at high speeds the mere removal of the foot from the accelerator causes a fairly rapid deceleration of a motor vehicle. In the past the operators of rear vehicles had to depend on the visual lessening of the distance between his vehicle and the vehicle in front of him to indicate this deceleration.

Past direction signal circuits also did not provide for any indication of an emergency stop condition. Finally, many States have enacted laws prohibiting the driving of a motor vehicle with only the lights normally used for parking on. Past direction signal circuits have not provided for the automatic cancellation of the park switch when the vehicle is in operation.

It is therefore an object of this invention to provide an improved direction signal circuit for motor vehicles.

It is another object of this invention to provide a direction signal circuit for motor vehicles which includes means for visually indicating by coded signals the vehicle operating conditions of parking, coasting, braking, turning, simultaneously braking and turning, and emergency stopping.

It is a further object of this invention to provide in a direction signal circuit for motor vehicles means for indicating by individually coded light signals in the front and rear of the motor vehicle, the vehicle operating conditions of coasting and parking with over-riding coded light signals for braking or future turning with a separate coded light signal for simultaneous braking and future turning.

It is another object of this invention to provide in a direction signal circuit for motor vehicles means for visually indicating the coasting condition of operation of the motor vehicle.

It is a further object of this invention to provide in a direction signal circuit for motor vehicles means for automatically cancelling out the park switch of said direction signal circuit when the vehicle is in a drive condition.

Figure 2:
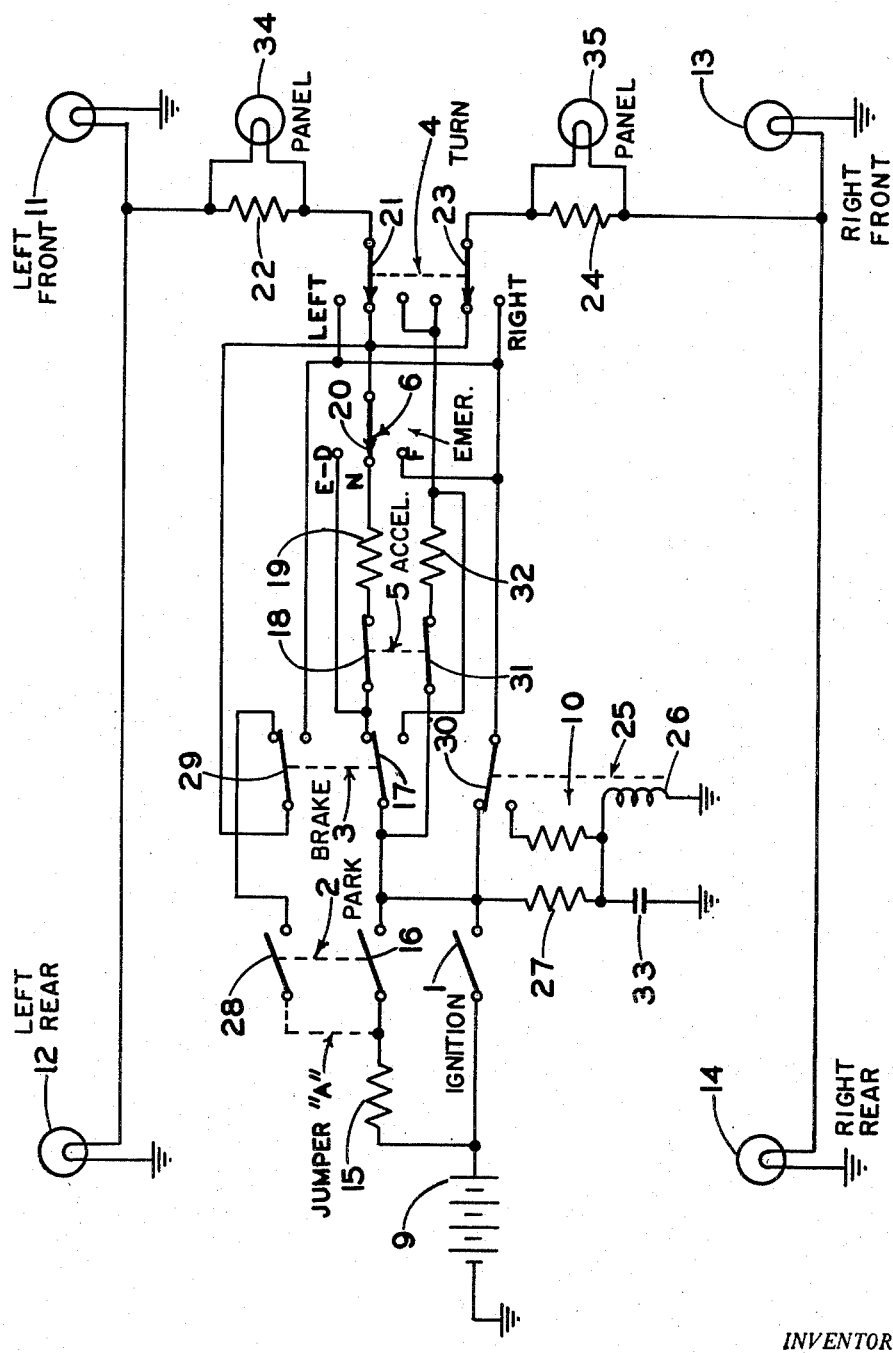

Other objects of this invention will become apparent from the following description taken in connection with the accompanying drawings in which Fig. 1 is a block diagram, partly schematic, of a preferred embodiment of the direction signal circuit contemplated by this invention, and Fig. 2 is a schematic drawing of the direction signal circuit of Fig. 1.

Referring now to Fig. 1 a block diagram, partly schematic, of a preferred embodiment of the direction signal circuit contemplated by this invention is shown. In this embodiment there is provided ignition switch 1, park switch 2, brake switch 3, turn switch 4, accelerator switch 5, and emergency switch 6. Each of these switches are positioned in the motor vehicle in a manner to be actuated either manually at the will of the operator or automatically upon a preselected action of the operator. Since the preferred operation of the direction signal circuit of this invention should entail a minimum of manual functions by the operator, as many as possible of the switches should be positioned to be actuated automatically. However, it is readily apparent that all of the above-mentioned switches can be positioned to be manually actuated at the will of the operator.

Ignition switch 1 is normally open when the vehicle is not operating and is preferably positioned to be closed automatically when the operator turns "on" the ignition. Park switch 2 is normally open but is preferably closed manually by the operator while parked at night. Brake switch 3 is preferably a double-pole, double-throw switch, i. e., a switch having two contact arms insulated from each other and adapted to move in unison between two positions, which is automatically actuated by the depression of foot brake pedal 7 by the operator. Turn switch 4 is preferably a double-pole, triple-throw switch, i. e., a switch having two contact arms insulated from each other and adapted to move in unison between three positions, which is manually operated between a neutral position and two selectively settable positions at the will of the operator. Accelerator switch 5 is preferably a double-pole switch which is normally closed and automatically opened when the operator depresses accelerator pedal 8 in the normal operation of the motor vehicle.

Thus both contact arms of switch 5 close automatically whenever the operator releases the pressure on accelerator pedal 8. Emergency switch 6 is preferably a single-pole, triple-throw switch which is manually operated by the operator. Each of these switches is constructed and positioned in accordance with principles well known to those skilled in the art and need not be further described here.

Battery 9 is a conventional six or twelve volt storage battery used as a source of current in most of the present day motor vehicles. Flasher 10 is provided to furnish intermittent coupling between battery 9 and lamps 11, 12, 13 and 14 under certain conditions to be described later. A preferred circuit for flasher 10 is shown in Fig. 2 and will be described in detail later. Left front lamp 11 and right front lamp 13 are positioned in the front end of the vehicle and are preferably provided with white lenses. Left rear lamp 12 and right lamp 14 are positioned in the rear end of the vehicle and are preferably provided with red lenses.

Referring now to Fig. 2 a schematic drawing of a preferred embodiment of the direction signal circuit contemplated by this invention is shown. In this drawing ignition switch 1 is in the "off" position, park switch 2 is in the "off" position, brake switch 3 is unactuated, i. e., brake pedal 7 is not being depressed, turn switch 4 is in the neutral position, accelerator switch 5 is in the actuated position, i. e., accelerator pedal 8 is not being depressed, and emergency switch 6 is in the normal position. Thus the switches are in the positions normally set for daytime parking. Under these assumed initial conditions, the front and rear lamps are all in the unlighted condition.

The operation of the direction signal circuit of this invention can best be described by illustration with an enumeration of the various possible conditions of operation of the motor vehicle and the resulting code of signals corresponding to each condition.

First, consider the night parking condition. In this condition, the operator of the motor vehicle actuates only park switch 2 on his dashboard. Assuming switches 1, 3, 4, 5, and 6 are in the conditions shown, lights 11, 12, 13 and 14 are energized from battery 9 via resistor 15, contact 16, contact 17, contact 18, resistor 19, contact 20, and contact 21 and resistor 22 or contact 23 and resistor 24. Resistor 15 is selected with a large enough resistance to prevent the actuation of relay 25 as a result of current flow through relay coil 26 via resistor 15, contact 16 and resistor 27. Therefore, all of lights 11, 12, 13 and 14 shine with a comparatively dim intensity due to the voltage drop across resistor 15.

Second, consider the normal drive condition. In this condition, ignition switch 1 is in the closed position, switches 3 and 4 are in the positions shown in Fig. 2, while switch 5 is opened due to the pressure of the operator's foot on accelerator pedal 8. If park switch 2 is open or in the "off" position, none of the lights in the front and rear of the vehicle are energized. If, however, park switch 2 is closed or in the "on" position, all of the lights are either energized or not energized, depending on whether jumper "A" is in the position shown or has been removed, respectively. When the vehicle is being operated with the park switch "on," this is known as a twilight operation. In some States such driving is prohibited, i. e., it is illegal to drive with only the "park" lights on. In such States jumper "A" should be removed, thereby insuring that the circuit between battery 9 and the lights is always broken as long as accelerator pedal 8 is depressed. In all other States, jumper "A" should be connected in the position shown in Fig. 2, thereby providing a continuous connection between the lights and battery 9 via resistor 15, contact 28, contact 29, and contact 21 and resistor 22 or contact 23 and resistor 24.

Third, consider the turn condition of operation while driving. When turn switch 4 is in the "left" position, left front and rear lights 11 and 12 are energized from battery 9 via switch 1, contact 30, contact 21 and resistor 22. For the present assume that flasher 10 intermittently interrupts the current flowing from battery 9 through contact 30 whenever contact 30 is connected directly to any of the lights. Therefore, any lamps which are connected directly to battery 9 through contact 30 of flasher 10 periodically flash instead of glowing steadily. Thus in the aforementioned "left" positioning of switch 4, lamps 11 and 12 flash. Similarly, if switch 4 is in the "right" position, lights 13 and 14 intermittently flash since they are connected to battery 9 via switch 1, contact 30, contact 23 and resistor 24.

Fourth, consider the operation of the circuit when brake switch 3 is actuated by the depression of the brake pedal by the operator. It does not matter what positions park switch 2, accelerator switch 5 and emergency switch 6 are in, since as long as switch 4 is in the neutral position, all of the lights are connected directly to battery 9 via contact 1, contact 30, contact 29, and contact 21 and resistor 22 or contact 23 and resistor 24. Since the lights are connected to battery 9 via contact 30, all of the lights flash intermittently.

Fifth, consider the simultaneous actuation of brake switch 3 while turn switch 4 is in one of the two selectively settable positions, "left" or "right." If turn switch 4 is in the "left" position, lamps 11 and 12 are connected to battery 9 via contact 1, contact 30 contact 21 and resistor 22. Since brake switch 3 is also actuated, right lamps 13 and 14 are connected directly to battery 9 via contact 1, contact 17, contact 23 and resistor 24. The right lamps therefore burn brightly continuously while the left lamps flash. Similarly, if switch 4 is in the "right" position, lamps 13 and 14 are connected to battery 9 via contact 1, contact 30, contact 23 and resistor 24, while lamps 11 and 12 are connected directly to battery 9 via contact 1, contact 17, contact 21 and resistor 22. The left lamps therefore burn brightly continuously while the right lamps flash intermittently.

Sixth, consider the condition of operation known as coasting. Under this condition switches 3, 5 and 6 are in the positions shown in Fig. 2, the condition of switch 2 is not important, while initially assume the position of switch 4 is the neutral position as shown. All of the lights 11, 12, 13 and 14 are connected to battery 9 via contact 1, contact 17, contact 18, resistor 19, contact 20 and contact 21 and resistor 22 or contact 23 and resistor 24. All of the lights therefore burn brightly continuously. If turn switch 4 is in the "left" position, lamps 11 and 12 are connected to battery 9 via contact 1, contact 30, contact 21 and resistor 22, while lamps 13 and 14 are connected directly to battery 9 via contact 1, contact 31, resistor 32, contact 23 and resistor 24. Thus, left lamps 11 and 12 flash intermittently, while right lamps 13 and 14 burn brightly continuously. The turning indication therefore overcomes the coasting indication. Similarly, if turn switch 4 is in the "right" position right lamps 13 and 14 are energized from battery 9 via contact 1, contact 30, contact 23 and resistor 24 while left lamps 11 and 12 are connected directly to battery 9 via contact 1, contact 31, resistor 32, contact 21 and resistor 22. Left lamps 11 and 12 therefore burn continuously while right lamps 13 and 14 flash intermittently.

The last condition of operation to be considered is the emergency condition. In this condition it is desired that all of the lamps flash intermittently thereby warning other motorists of the emergency condition of the instant vehicle. Emergency switch 6 is normally in the neutral position shown in Fig. 2. The operator, either manually by turning a switch on the dashboard or automatically by depressing the emergency brake pedal (not shown), changes the position of switch 6 to the "flash" position, indicated by "F" in Fig. 2. When this is done, all of lamps 11, 12, 13 and 14 are connected to battery 9 via contact 1, contact 30, contact 20 and contact 21 and resistor 22 or contact 23 and resistor 24. All of the lamps therefore flash intermittently as long as ignition switch 1 is in the "on" position.

In addition to the foregoing there is provided an emergency drive condition of operation. This condition is particularly useful in those States where jumper "A" is removed, thereby cancelling out the twilight operation of the motor vehicle. In this emergency drive condition, it is desired that all of the lamps burn when driving normally. This condition is useful when it is necessary to drive at night and the main headlights (not shown) are burned out or otherwise inoperative. Switch 6 is manually turned to the emergency drive or "E–D" position in Fig. 2. All of lamps 11, 12, 13 and 14 are then connected to battery 9 via contact 1, contact 17, contact 20 and contact 21 and resistor 22 or contact 23 and resistor 24. All of the lamps therefore burn continuously. It is noted that depressing brake pedal 7 breaks this connection thereby producing the normal braking indication.

Flasher 10 of Fig. 2 accomplishes the intermittent connect-disconnect function by automatically switching the connections to the lights between a high voltage (the voltage of battery 9) and a comparatively low voltage whenever the flasher is loaded by a path to ground through contact 30. Thus, when ignition switch 1 is initially closed, capacitor 33 acquires a charge through timing resistor 27. When the charge on capacitor 33 reaches a preselected magnitude, sufficient current flows through relay coil 26 to cause actuation of relay 25 and the switching of contact 30. Contact 30 remains in the switched position until the right terminal of contact 30 is connected to ground through the signal lamps by the actuation of an appropriate switch. Such a grounding connection provides an additional path for the charge on capacitor 33 to bleed off to ground. As the charge on capacitor 33 drops to a preselected value, it is no longer able to supply sufficient current through coil 26 to maintain the relay closed. Contact 30 returns to the unactuated position thereby subjecting the lamps to the full battery voltage and causing them to light. Capacitor 33 again starts to recharge and eventually reactuates relay 26. This series of steps of charging and discharging capacitor 33 continues as long as the lamps are directly connected to contact 30.

Left and right dash lights 34 and 35 provide a visual indication to the operator of the motor vehicle as to the signals being transmitted by the signal lamps. The lamps are preferably provided with green lenses. By appropriately selecting the bulbs used for lights 34 and 35 and the magnitudes of resistors 22 and 24, the bulbs become an indicator of the operativeness of the signal lamps. It is obvious that if both lamps 11 and 12 are burned out, then left dash lamp 34 will not light under any condition. Assume, however, that only one of the lamps 11 or 12 burns out. If, by way of example, but not by way of limitation, each of lamps 11 and 12 normally draws one ampere of current, then normally two amperes of current flows through resistor 22 thereby creating a voltage drop across resistor 22 sufficient to light to normal brilliance dash light 34. If one of lamps 11 and 12 is burned out, the current through resistor 22 is only about one ampere. The resulting voltage drop across resistor 22 is only half the normal value resulting in a comparatively dim lighting of dash light 34. It is immediately apparent to the operator of the vehicle that there is a defect in one lamp of his left lamp circuit. The right lamp circuit is similarly constructed.

The advantages of the direction signal circuit of this invention over prior signal circuits is readily apparent. In the park or conditional twilight traveling condition all of the lamps are lighted. The park lights are automatically cancelled out under normal driving conditions, if jumper "A" is removed. In the coasting condition all of the lights burn steadily. In the braking condition all of the lights flash intermittently. In a contemplated turn condition, the lights on the side toward which the operator intends to turn flash intermittently. In the braking-contemplated turn condition, the lights on the side toward which the operator intends to turn flash intermittently, while the lights on the other side burn brightly steadily. In the emergency park condition, all of the lights flash intermittently. The dash lights indicate the inoperativeness of one or more of the signal lights and further indicate the side and number of inoperative lights.

Although the invention has been described and illustrated in detail, it is to be clearly understood that the same is by way of limitation and example only and is not to be taken by way of limitation, the spirit and scope of this invention being limited only by the terms of the appended claims.

I claim:

1. A direction signal circuit for motor vehicles comprising a right front lamp, a left front lamp, a right rear lamp and a left rear lamp; a current source; a normally closed accelerator switch; an emergency switch; an intermittent current interrupting means; an accelerator pedal; means responsive to the depression of said accelerator pedal for opening said accelerator switch; means electrically connecting said current source and said accelerator switch in series; means electrically connecting said current source, said emergency switch and said current interrupting means in series; and means electrically connecting all of said signal lamps across both of said series circuits.

2. A direction signal circuit for motor vehicles comprising a right front lamp, a left front lamp, a right rear lamp and a left rear lamp; a current source; a normally closed accelerator switch; an accelerator; means responsive to the actuation of said accelerator for opening said accelerator switch; a two-position emergency switch having a normal position and an emergency position; intermittent current interrupting means; means electrically connecting said current source, said accelerator switch and the normal position of said emergency switch in series; means electrically connecting said current source, said current interrupting means and the emergency position of said emergency switch in series; and means electrically connecting all of said signal lamps across both of said series circuits.

3. A direction signal circuit for motor vehicles comprising a right front lamp, a left front lamp, a right rear lamp and a left rear lamp; a current source; a two-position, foot-brake-operated switch having an actuated position and an unactuated position; a manually operated turn switch having a neutral position and two selectively settable "left" and "right" positions; a normally-closed accelerator switch; a two-position emergency switch having a neutral position and an emergency position; a normally-open ignition switch; means responsive to the closing of said ignition switch and said accelerator switch when said foot-brake-operated switch is in said unactuated position and said turn switch is in said neutral position to constantly energize all of said lamps from said current source; intermittent current interrupter means for intermittently opening and closing an electric circuit; means responsive to the actuation of said foot-brake-operated switch and to the closing of said ignition switch when said turn switch is in the neutral position for energizing all of said lamps from said current source through said current interrupter means; means responsive to the closing of said ignition switch and to the setting of said turn switch in said "right" position when said foot-brake-operated switch is in the unactuated position for energizing both right lamps from said current source through said current interrupter means; means responsive to the closing of said ignition switch and to the setting of said turn switch in said "left" position when said foot-brake-operated switch is in the unactuated position for energizing both left lamps from said current source through said current interrupter means; means responsive to the closing of said ignition switch and the actuation of said foot-brake-operated switch and to the selective setting of said turn switch in said "right" position for energizing both right lamps from said current source through said current interrupter means while simultaneously constantly energizing both left lamps from said current source; means responsive to the closing of said ignition switch and the actuation of said foot-brake-operated switch and to the setting of said turn switch in said "left" position for energizing both left lamps from said source through said current interrupter means while simultaneously constantly energizing both right lamps from said current source; and means responsive to the closing of said ignition switch and the positioning of said emergency switch in said emergency position while said turn switch is in the neutral position for energizing all of said lamps from said source through said current interrupter means.

4. The direction signal circuit of claim 3 and further comprising a right dash light; a left dash light; means connecting said right front lamp and said right rear lamp in parallel with said right dash light in series with said parallel connection; and means connecting said left front lamp and said left rear lamp in parallel with said left dash light in series with said parallel connection.

5. A direction signal circuit for motor vehicles comprising a right front lamp, a left front lamp, a right rear lamp and a right front lamp; a current source; a brake switch having contacts positioned to move between an actuated position and an unactuated position; a brake; means responsive to the actuation of said brake for moving said contacts of said brake switch from said unactuated position to said actuated position; a turn switch having contacts positioned to move between a neutral position and a "left" and "right" selectively settable positions; an accelerator switch having contacts positioned to move between an open position and a closed position; an accelerator; means responsive to the actuation of said accelerator for moving said contacts of said accelerator switch from said closed position to said open position; an emergency switch having a contact positioned to move between at least a neutral position and an emergency position; an ignition switch having a normally open contact; intermittent current interrupter means having a contact which opens and closes intermittently when subjected to current flow of predetermined magnitude; means responsive to the closing of said ignition switch when said brake switch and accelerator switch are in said unactuated positions and when said emergency switch and said turn switch are in said neutral positions for constantly energizing all of said lamps from said source; means responsive to the actuation of said brake switch and the closing of said ignition switch when said turn switch is in said neutral position for energizing all of said lamps from said source through said contact of said current interrupter means; means responsive to the positioning of said turn switch in said "left" position and to the closing of said ignition switch for energizing said left front and rear lamps from said source through said contact of said current interrupter means; means responsive to the positioning of said turn switch in said "right" position and to the closing of said ignition switch for energizing said right front and rear lamps from said source through said contact of said current interrupter means; means responsive to the actuation of said brake switch and the closing of said ignition switch when said turn switch is in said "left" position for constantly energizing said right front and rear lamps from said source; means responsive to the actuation of said brake switch and the closing of said ignition switch when said turn switch is in said "right" position for constantly energizing said left front and rear lamps from said source; and means responsive to the positioning of said emergency switch in said emergency position and the closing of said ignition switch when said turn switch is in said neutral position for energizing all of said lamps from said source through said contact of said current interrupter means.

6. A direction signal circuit as recited in claim 5 and further comprising a park switch having a normally open contact; and means responsive to the closing of said park switch when said brake switch and said accelerator switch are in said unactuated positions and said emergency switch and said turn switch are in said neutral positions for constantly energizing all of said lamps from said source.

7. A direction signal circuit as recited in claim 5 and further comprising a park switch having contacts positioned to move between an open position and a closed position; and means responsive to the closing of said park switch when said brake switch is in said unactuated position and said turn switch is in said neutral position for constantly energizing all of said lamps from said source.

8. A direction signal circuit as recited in claim 5 in which said left front and rear lamps are connected in parallel and in which said right front and rear lamps are connected in parallel and further comprising a right dash lamp; a left dash lamp; means for electrically connecting said right dash lamp in series with said parallel-connected right front and rear lamps; and means for electrically connecting said left dash lamp in series with said parallel-connected left front and rear lamps.

References Cited in the file of this patent

UNITED STATES PATENTS

| | | |
|---|---|---|
| 2,275,695 | Stafford | May 10, 1952 |
| 2,321,803 | Flange et al. | June 15, 1943 |
| 2,652,553 | Hollins | Sept. 15, 1953 |
| 2,692,981 | Hollins | Oct. 26, 1954 |